FIG.1

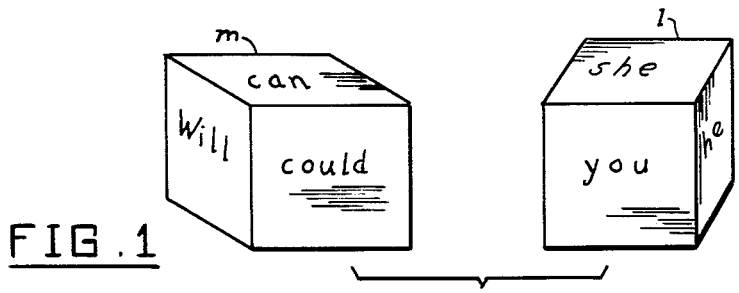

| a | b | c | d | e | f | g | h | i | j | k |
|---|---|---|---|---|---|---|---|---|---|---|
| Monday | my | father | found | two | nice | large | brown | plastic | dolls | here |
| Tues. | your | mother | bought | three | new | small | blue | clay | toys | too |
| Thurs. | her | sister | brought | four | clean | little | yellow | rubber | balls | also |
| Friday | his | brother | made | five | pretty | long | red | wood | boats | finally |
| Sat. | our | grandma | had | six | good | big | white | paper | books | then |
| Sunday | their | grandpa | wanted | seven | heavy | colored | green | card-board | games | only |

FIG.2

| b | f | g | c | k | d | e | h | i | j | a |
|---|---|---|---|---|---|---|---|---|---|---|
| my 1 | nice 4 | large 2 | brother 3 | then 5 | made 4 | two 3 | red 2 | plastic 6 | boats 1 | Monday 3 |
| her 3 | pretty 2 | little 1 | sister 5 | also 2 | wanted 6 | four 5 | blue 4 | paper 3 | dolls 2 | Sunday 6 |

FIG.3

June 13, 1961  B. H. STOLPEN  2,987,833
READING BLOCKS

Filed Oct. 17, 1958  2 Sheets-Sheet 2

| l | m | n | o | p | q | | r | s | t |
|---|---|---|---|---|---|---|---|---|---|
| We | can | go | in | this | house | | in this house | Adam | find | |
| you | can't | run | around | that | box | | around that box | Rodger | buy | |
| he | will | see | from | the | barn | | from the barn | Nancy | take | |
| she | won't | play | under | a | tree | | under a tree | Sally | make | |
| I | could | look | over | any | boat | | over any boat | Richard | have | |
| they | couldn't | work | on | another | car | | on another car | Jane | want | |

FIG. 4

|  | ask for |  |  |  | Post Cereal |  |  |
|---|---|---|---|---|---|---|---|
| for goodness sake | demand | request | let's buy | Dove Soap | Borden's Product | Schenley | Kent |
|  | take only |  |  |  | Piel's |  |  |

FIG. 5

INVENTOR.
BEULAH HARRIS STOLPEN
BY Herman L. Gordon
ATTORNEY

2,987,833
READING BLOCKS
Beulah Harris Stolpen, 41 W. 72nd St., New York, N.Y.
Filed Oct. 17, 1958, Ser. No. 767,849
2 Claims. (Cl. 35—71)

This invention relates to a new and useful process for using cubes, blocks or dice in an educational, entertaining or advertising manner in order to improve sight reading skills, the familiarization of words and their place in a sentence or a question, and increase rapidity and comprehension of phrasing and sentence structure.

A primary object of this invention is to aid in understanding the structure of a sentence or question in its complete form by using all the cubes selected, and by the nature of the indeterminate sequence of the structure show the changes in meaning of a sentence or question by the use of the same words in different positions.

Another object of the invention is to provide an instructive game of enjoyment and amusement to challenge the ingenuity and individual initiative of the participant.

Still another object of the invention is to provide a simple and comprehensive method of helping foreign students to a better understanding of the structure of the English language, particularly as it differs from other languages in the nature of the article and the placement of adjectives and adverbs.

Still another object of the invention is to teach phrasing and its relationship to the structure of a sentence.

And still another object of the invention is as an advertising device for product identification and amusement.

The apparatus consists of a plurality of cubes, blocks or dice either numbered or unnumbered with a word or a plurality of words exhibited on each of the 6 faces of each of the cubes in such a manner that a complete and perfectly grammatical sentence or question can be arranged in an indeterminate sequence by the use of 2—3—4—5—6—7—8—9—10—11 or more cubes. Any number of cubes in a set can be selected and added at random to the basic cubes in the set and will, when cast, and arranged in optional sequence, form a sentence or a variety of sentences on whatsoever side they may fall. The use of 11 cubes in a set for example, will make over 362,797,056 (6) different sentence or question combinations. Since the cubes can be arranged in indeterminate sequence, and also since sentences can be made by the addition or subtraction of cubes, the infinite number of sentence combinations possible is readily discernible. Further indications of this feature will be more apparent in the accompanying drawings.

In the drawings:

FIGURE 1 is an isometric view of two of the cubes used in the device.

FIGURE 2 is a chart of all six faces of a sample series of a set of 11 cubes based on a foundation unit of three cubes.

FIGURE 3 is a perspective view of the same series as in FIGURE 2 cast at random and arranged in a different sequence. The numbers thereon are affixed for the purpose of scorekeeping when the device is used as a competitive game.

FIGURE 4 is a chart of a different group of cubes . . . $l,m,n,o,p,q$ form the basic structure for a sentence, a question or a phrasing unit. $r,s,t$ depict a type of words or plurality of words to be used alternately with the pattern of FIGURES 2 and 4 to emphasize the extreme variability of the invention.

FIGURE 5 is a diagrammatic or unfolded view of all 6 faces of a sample of any of the cubes showing a word or a plurality of words inscribed upon a cubical sphere—the specific words utilized thereon depict the use of the device for product advertising and identification.

The cubes are to be made of plastic, wood, paper, clay or any other suitable material and marked by stamping, engraving, embossing, screen printing or printing either directly to the surface of the cube or on a substance that would be encased by a transparent cube. It is understood that changes in form, proportion, size and minor features of construction within the scope of the claims may be resorted to without departing from the spirit of the invention.

I have shown in the drawings a variation of word selections forming different and interchangeable groupings, obviously many more are possible as long as the continuity is consistent with the basic premise. As long as the basic units of the set are included (the number of such basic units will vary according to the set) then any number of other cubes in the set may be added individually or in any desired combination and when cast indiscriminately can be arranged to form a complete and perfectly grammatical sentence or question or a variety of sentences or questions of indeterminate sequence regardless of which face of the cube is exhibited. To describe this feature in more detail, for example: FIGURE 4 could be arranged to form a sentence $l\ m$—or a question $m\ l$. In FIGURE 2 the basic group "$cdj$" forms a complete sentence and would be distinguished from the balance of the cubes in the set by a difference of color. Therefore it would be understood that the basic units or foundation group of a set must be used together and any or all of the other cubes could be added as desired. To form a 4 word sentence, $a,b,e,f,g,h,i$ or $k$ could be added to $cdj$ and a sentence could be made in a variety of ways; for example if $b$ was used the sentence could be arranged either $bcdj$ or $cdbj$. For a 5 word sentence any 2 of the aforementioned cubes could be added to $cdj$. As the number of cubes increases the number of sentences possible with each cast increases. Because the structure of the invention is such that there is no predetermined sequence if a group of cubes such as $a,b,e,f,g,k$ were added to $cdj$ the following sentence combinations would be possible: $abcdefgjk$, $bcdefgjka$, $akbcdefgj$, $akbfcdegi$, $akbgcdefj$, $akbfgcdej$, $abfcdegjk$, $abgcdef\ jk$, $abfgcdejk$, $bfckdegja$, $ckdbfegja$, $ackdbfegj$, $acdbefgjk$. The number of sentences would vary according to the ingenuity of the participant. If each of the combinations possible on a cast could be arranged in but one sentence 362,797,056 different sentences would be possible—therefore because of the variability due to the absence of a predetermined arrangement of the cubes, and because of the optional number of cubes used, it is obvious that the exact number of sentences possible is beyond a limit that would justify the necessity of calculating.

The chart of the series in FIGURE 4 is set forth to show a series with a plurality of basic units—this series can be made to form a sentence, a question or a phrase. Units $r$, $s$ and $t$ are shown to simplify the explanation of the extreme variability of the invention and the interchange of various cubes in different series or sets. In this set the basic units $lmn$ will make a sentence, $mln$ will make a question. Units $o$, $p$, $q$, can be added as a unit to $lmn$ to be arranged as either a sentence or a question or can be used separately as a unit to teach phrasing. Units $a$, $f$, $g$, $h$, $i$ and $k$ can be added singly or in any desired combination to $opq$ and will still show the element of phrasing and an incomplete sentence. However when added to $lmnopq$ either singly or in any desired combination $afghik$ can be arranged in over 2,176,782,336 sentences and over 2,176,782,336 questions. Unit $r$ can be combined with $lmn$ instead of $opq$ and shows a plurality of words on one cube. Unit $s$ can be used instead of $c$ or $l$. Unit $t$, the present tense of *d* when added to *lm* can be used with *pq* to form *lmtpq* to which *a, f, g, h, i* and *k* can be added in any desired combination; in conjunction with *m t* can be used in place of *d* to form a basic unit of *cmtj* to which *abefghik* can be added in any desired combination to form a sentence or a question.

Each of the cubes is so inscribed that a similar structural part of a sentence is contained thereon. A subject, which can be either a noun or a pronoun, a predicate and an object are generally used as a basic structure though as in FIGURE 1, a noun and a verb are all that is necessary. The modifying cubes can contain either an adjective or an adverb or a plurality of words can appear on each or any of the faces of the cube as long as they are so designed that they can be interchangeable with all other cubes to form a perfect sentence regardless of the number of cubes used or which face turns up in the random casting of the cubes once the basic structure is followed. In most instances only one figure of speech will appear on each cube in order to facilitate the use of the device as a teaching aid, and to more fully familiarize the student with the various parts of speech and their relationship. However it is not essential to follow this as a rule in the execution of the invention, for as long as the basic structure of the device is consistent in content then all cubes can fit into a complete sentence regardless of how they may fall when cast. Any cube can contain a plurality of different parts of speech such as: one cube could contain the words my mother, his sister etc.—or mother can, sister will etc.—or phrases such as in the house, over the box etc.—or participle and preposition combinations such as travelling to, laughing at etc. Therefore I have shown that the essential element of the invention is that regardless of what word or plurality of words are inscribed on the cubes each side can be used in the same position in the structure of the sentence as any other side of the same cube, and that all cubes of each set or series will follow the basic pattern of the invention.

As an educational device the words inscribed on the blocks become rapidly recognizable through familiarity. The arrangement of the cubes in sentences familiarizes the user with the proper structure and contents of a complete sentence. The necessity of utilizing al cubes selected increases the comprehension of a completed sentence and eliminates the possibility of hanging parts, a common fault of youngsters learning sentence construction (except in the use of a phrase, where this becomes a purposeful part of the invention). The extreme variability of the arrangements due to the indeterminate sequence challenges the ingenuity of the participant and makes an amusing game of a normally tedious learning process.

When the device is to be used as a game, in addition to the word, a number is affixed adjacent to the word or words on each of the faces of the cubes. In numbering the cubes integers are preferred although fractional numbers can be used. This number is used for scorekeeping purposes. As a competitive game it can be played by one or more persons. The players decide upon the number of cubes to be used; this would depend upon the ability of the players. The cubes are cast and must be arranged in a sentence or question using the top faces of the cubes when they come to rest and all the cubes cast must be arranged in the sentence or question. A complete sentence is always possible as long as the basic cubes designated in each set are included. Any of the other cubes in the set or series can be added singly or in any desired combination. In order to score a player must read correctly and arrange in a sentence the word or words appearing on the uppermost faces of the cubes and arrange all the cubes cast in a sentence. The numbers appearing on the faces of these cubes are added for scorekeeping. Each time a word is used in a different position in the sentence the number is added to the score. Since the pattern of the arrangement of the sentence or question is indeterminate it is completely dependent upon the ingenuity of the player, for example in a simple grouping of just 6 cubes the following combinations are possible: "Our father found two large toys." "Our large father found two toys." "Father found our two large toys." Thus the number adjacent to "our" would be added twice to the score, for in one position it would modify father and in the other position it would modify toys, each time changing the full meaning of the sentence—the same would apply for "large." In this way the participant becomes more familiar with the changes in meanings of the sentences by the change in position of the same words, and is rewarded for skill. This also shows how variable is the number of sentence possibilities contained in each cast of the cubes.

For advertising purposes one cube would always contain the name of the advertiser or the name of the advertiser and one of his products on each of the faces of the cube. The other cubes would be so ascribed as to point out features of the product and when cast would combine in an indeterminate arrangement in such a way as to carry an advertising message. One or a plurality of the cubes could, in addition to the word or words inscribed thereon, also carry a picture as product identification or a picture that would fit into the question, sentence or phrase in conjunction with the word or words inscribed thereon, or in lieu of a word or words.

What I claim is:

1. A device of the character described comprising a plurality of cubes, each having a different word on each of its faces, the words on all the faces of each cube being of like grammatical character, there being at least two cubes constituting a foundation group whose faces respectively contain words constituting subjects and predicates in a sentence, whereby the cubes when randomly positioned on a horizontal surface may be arranged so that the words on their uppermost faces form a complete and grammatical sentence regardless of which face of any cube is uppermost.

2. A device of the character described comprising a plurality of cubes adapted to be randomly positioned on a horizontal surface with any of their faces uppermost, each having a different word on each of its faces, the words on all the faces of each cube being of like grammatical character, there being at least three cubes constituting a foundation group whose faces respectively contain words constituting subjects, predicates and objects in a sentence, whereby the cubes when randomly positioned may be arranged so that the words on their uppermost faces form a complete and grammatical sentence regardless of which face of any cube is uppermost.

References Cited in the file of this patent

UNITED STATES PATENTS

| | | |
|---|---|---|
| 341,754 | Kenyon | May 11, 1886 |
| 557,307 | Foster | Mar. 31, 1896 |
| 1,542,031 | Bruhn | June 16, 1925 |
| 2,386,114 | Hayes | Oct. 2, 1945 |